United States Patent [19]
Coursolle et al.

[11] Patent Number: 4,594,504
[45] Date of Patent: Jun. 10, 1986

[54] LIGHT MODULATION SENSOR IN A VORTEX SHEDDING FLOWMETER

[75] Inventors: Thomas P. Coursolle, St. Paul; Patrick J. Murphy, Winsted, both of Minn.

[73] Assignee: Rosemount Inc., Eden Prairie, Minn.

[21] Appl. No.: 530,200

[22] Filed: Sep. 8, 1983

[51] Int. Cl.$^4$ .............................................. H01J 5/16
[52] U.S. Cl. .................. 250/227; 250/231 P; 73/705; 73/861.24
[58] Field of Search ............. 250/227, 231 R, 231 P, 250/216; 350/96.15, 96.16, 96.18, 96.23, 96.24, 96.3; 455/610, 612; 367/8, 64; 73/655, 656, 861.23, 861.24, 861.47, 499, 516 R, 517 R, 705, 717, 723

[56] References Cited

U.S. PATENT DOCUMENTS

| | | | |
|---|---|---|---|
| 4,071,753 | 1/1978 | Fulenwider et al. | 250/231 R |
| 4,158,310 | 6/1979 | Ho | 73/705 |
| 4,160,600 | 7/1979 | Luke | 250/231 P |
| 4,163,397 | 8/1979 | Harmer | 73/800 |
| 4,191,470 | 3/1980 | Butter | 356/35.5 |
| 4,322,829 | 3/1982 | Davis, Jr. et al. | 367/178 |
| 4,322,978 | 4/1982 | Fromm | 356/376 |
| 4,322,979 | 4/1982 | Fromm | 73/705 |
| 4,360,247 | 11/1982 | Beasley | 350/96.15 |
| 4,372,165 | 2/1983 | Pitt et al. | 73/861 |
| 4,376,390 | 3/1983 | Rines | 73/653 |
| 4,440,027 | 4/1984 | Focht | 73/717 |
| 4,493,212 | 1/1985 | Nelson | 73/705 |

FOREIGN PATENT DOCUMENTS

82/00155 6/1982 PCT Int'l Appl.

OTHER PUBLICATIONS

Kazuo Kyuma, Shuichi Tai, Koichi Hamanaka and Masahiro Nunoshita, "Laser Dopper Velocimeter with a Novel Optical Fiber Probe", 15 Jul. 1981, *Applied Optics*, vol. 20, No. 14, pp. 2424–2427.

*Primary Examiner*—David C. Nelms
*Attorney, Agent, or Firm*—Kinney & Lange

[57] ABSTRACT

A sensor which provides an output signal representative of a parameter such as pressure, includes a reflector, a lens and a waveguide which are relatively movable as a function of the parameter. Light from a light source is transmitted by the waveguide toward the reflector. The lens, which is positioned between the waveguide and the reflector directs the light from the waveguide to the reflector and focuses the reflected light proximate a receiving surface of the waveguide. A sensor housing supports the waveguide, lens and reflector so that a relative physical displacement between the waveguide, lens and reflector occurs which is responsive to the parameter. The light received by the waveguide at its receiving surface is a function of the relative physical displacement, and thus a function of the parameter. The waveguide transmits the received light to a light detector which produces an electrical output signal which is a function of the received light and therefore of the parameter.

11 Claims, 8 Drawing Figures

LIGHT MODULATION SENSOR IN A VORTEX SHEDDING FLOWMETER

BACKGROUND OF THE INVENTION

1. Field of the Invention

The present invention relates to optical sensors and more particularly to an optical sensor for modulating light responsive to a parameter.

2. Summary of the Invention

A sensor which provides an output light signal representative of a parameter includes reflector means, waveguide means, lens means, and displacement means. The waveguide means transmits light toward the reflector means and receives light reflected from the reflector means to produce the light output signal. The lens means is positioned between the waveguide means and the reflector means. The lens means directs the light from the waveguide means to the reflector means, and focuses the light reflected by the reflector means to a light spot proximate the waveguide means. The light received by the waveguide means is a function of the relative positions of the waveguide means, the reflector means, and the lens means.

The displacement means causes relative movement of the reflector means or the lens means, or both, with respect to the waveguide means as a function of the parameter. This causes the amount of the light received by the waveguide means to vary as a function of the parameter.

In preferred embodiments, the sensor includes a sensor housing which supports at least one of the waveguide means, the reflector means, and the lens means in a fixed position to the housing. The displacement means is coupled to the housing and is responsive to the parameter to cause physical movement of at least one of the reflector means, the lens means, and the waveguide means with respect to the means which is supported in fixed relationship to the housing, so that relative movement of at least the reflector means or the lens means with respect to the waveguide means occurs as a function of the parameter.

In preferred embodiments, the waveguide means includes one or more optical fibers. The waveguide receives light from a light source and guides that light to a transmitting surface where the light is transmitted toward the reflector means. The waveguide has a receiving surface (which may be the same as the transmitting surface, depending upon whether one or more optical fibers are included in the waveguide) which receives the light from the reflector means. The received light is guided by the waveguide to a light detector, which produces an electrical output signal as a function of the intensity of the light output signal.

The lens means has an optical axis which is generally parallel to a path between the waveguide and the reflector means. The location of the light spot in a radial direction with respect to the optical axis is a function of the radial distance between the center of the transmitting surface and the optical axis. In a preferred embodiment, the displacement means causes relative radial movement of the lens means with respect to the waveguide, so that the location of a light spot formed by the focused light with respect to the receiver surface (and thus the intensity of the light received at the receiver surface) varies as a function of the parameter.

In a further preferred embodiment, the housing comprises a vortex shedding bar for inducing vortices in a flowing fluid. The displacement means comprises a motion transmitting assembly which is supported by the shedding bar within the vortices and which is physically repetitively displaced responsive to the vortices. The lens means comprises approximately a one-quarter pitch graded index lens having an index of refraction which varies as a function of radial distance from its optical axis. Light paths through a one-quarter pitch graded index lens have the shape of one-quarter wavelength of a sine wave signal. The lens is supported by and movable with the motion transmitting assembly and moves in the radial direction generally normal to the optical axis in response to movement caused by the vortices. The waveguide comprises a first and a second optical fiber disposed substantially equidistant and diametrically about the optical axis of the lens when the parameter has a predetermined value. The first fiber transmits light into a first end of the lens. The lens refracts the light and the reflector at a second end of the lens reflects the light back through the lens to focus the light to the light spot so that at least a portion of the reflected light spot is received by the second fiber. The position of the light spot and therefore the intensity of the light received by the second fiber is a function of the radial distance between the optical axis of the lens with respect to the first fiber. As the radial distance changes, the position of the light spot with respect to the second fiber varies (and thus the light intensity received by the second fiber varies), as a result of radial displacement of the lens. The amount of reflected light incident on the second fiber preferably varies as twice the radial displacement between the optical axis of the lens and the first fiber, thus providing a sensor which is very responsive to displacement.

In a further preferred sensor embodiment, the waveguide is a single multimode optical fiber which provides light to a first end of a one-half pitch graded index lens. The lens refracts the light and focuses the light to a light spot at the second end of the lens. A movable mirror is positioned adjacent the second end of the lens to reflect at least a portion of the focused light spot back into the lens and toward the optical fiber. The mirror is displaced with respect to the lens responsive to the parameter such that the amount of light reflected is a function of the parameter. The light is focused, and preferably has a small cross section at the mirror such that small displacements of the mirror result in substantially full range changes in the amount of light reflected. The reflected light is refracted through the lens and focused on the fiber. The received light is transmitted by the fiber to a beam splitter, which directs the received light to a detector. The detector provides an output signal as a function of the intensity of reflected light received by the fiber, and thus as a function of the parameter.

One benefit of the present invention is that use of a graded index lens provides efficient electromagnetic coupling between lens and waveguide such that coupling and transmission losses are minimized. A further benefit arises because the sensor is inherently single sided, which means that fibers transmit and receive light from one side of the lens. This simplifies manufacturing and, in the case of use as a vortex sensor, it permits both of the fibers to be disposed within a rigidly supported portion of the shedding bar such that fiber movement (which can affect light transmission characteristics and therefore intensity of the output signal) is minimized.

DETAILED DESCRIPTION OF THE PREFERRED EMBODIMENTS

Figure 1:
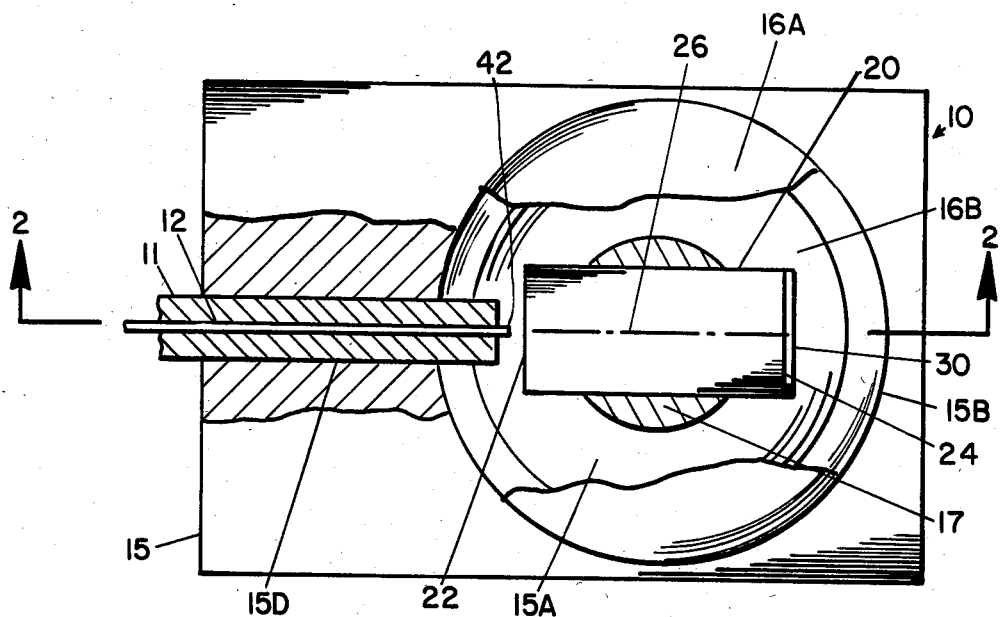
FIG. 1 is a top view, partially in section, of a light modulation sensor having a waveguide and light modulator made according to the present invention.
Figure 2:
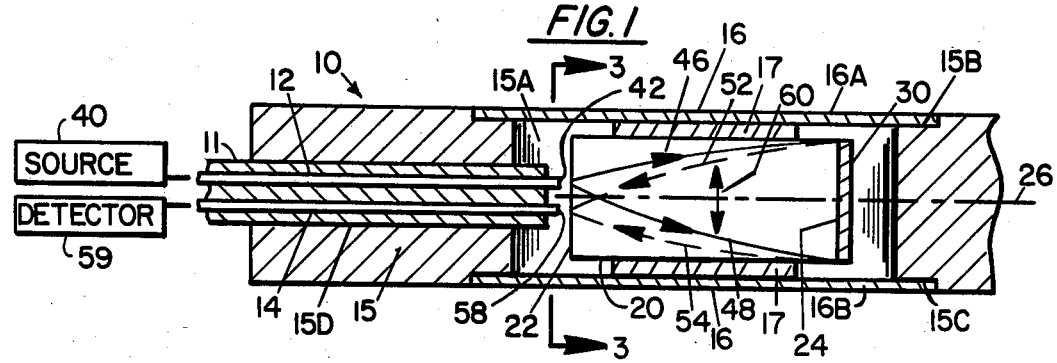
FIG. 2 is a sectional view of the light modulation sensor taken along line 2—2 of FIG. 1.
Figure 3:
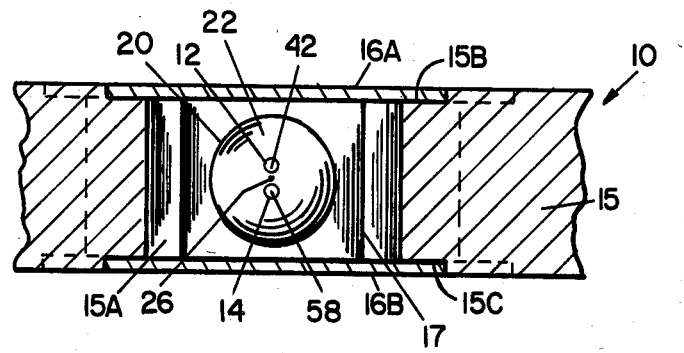
FIG. 3 is a sectional view of the light modulation sensor taken along line 3—3 of FIG. 2.

A light modulation sensor is indicated generally at 10 in FIGS. 1, 2 and 3 which are different views of a preferred embodiment. The sensor 10 comprises a light waveguide means (or conduit) 11 having a first fiber optic waveguide 12 and a second fiber optic waveguide 14 disposed therein for transmitting and receiving light. Light, as used herein, is defined as electromagnetic radiation of all frequencies including visible, infrared and ultraviolet portions of the spectrum. Conduit 11 is disposed within a sensor housing means 15 which is made of stainless steel or other suitably rigid material. Housing 15 has a hole 15A therethrough (which is preferably formed by boring). A displacement means 16, in the form of first and second diaphragms 16A and 16B are affixed to cover the first and second ends respectively, of hole 15A without significantly protruding from housing 15. First diaphragm 16A is seated in first annular groove 15B formed about the first end of hole 15A on one side of the housing 15. First diaphragm 16A is much thinner than housing 15 and is preferably formed of stainless steel such that at least a portion of first diaphragm 16A moves toward and away from housing 15 in response to force having a component substantially normal to the outer surface of first diaphragm 16A. Second diaphragm 16B is similarly positioned over the second end of hole 15A in second annular groove 15C formed on the other side of housing 15 about the second end of hole 15A. A cylindrical spool 17 is coupled between the first and second diaphragms 16A and 16B and is displaced responsive to the movement of the first and second diaphragms 16A and 16B. A lens means (which is preferably a graded refractive index lens 20) is disposed within spool 17 and is electromagnetically coupled to first fiber optic waveguide 12 and second fiber optic waveguide 14. Conduit 11 extends through a bore 15D in housing 15 and into hole 15A toward lens 20. Lens 20 has a first end 22, a second end 24 and an optical axis 26. Lens 20 is preferably formed of silica and is cylindrical in shape and has an index of refraction which preferably decreases as a function of radial distance from optical axis 26. Light travelling through lens 20 is refracted in a preselected manner dependent on its index of refraction. In the embodiment shown in FIGS. 1-3, lens 20 is approximately a one-quarter pitch lens such that the light is refracted the equivalent of one-quarter wavelength of a sine wave. Lens 20 in further preferred embodiments comprises integer multiples of approximately a one-quarter pitch lens as desired. The light rays from first fiber optic waveguide 12 which enter first end 22 are refracted by lens 20 such that they are substantially parallel to optical axis 26 at second end 24 of lens 20. A reflective surface 30 such as a mirror, is disposed at second end 24 such that the light rays are reflected back toward the first end 22. Reflective surface 30 in one embodiment is preferably formed directly on second end 24 by sputtering, vapor deposition or other coating techniques. The reflected light rays are refracted by lens 20 to focus as a light spot at the first end of lens 20. The amount of the light spot which impinges upon second fiber optic waveguide 14 depends upon the displacement between lens 20 and the first and second waveguides 12 and 14. An output signal in the form of the light received by second waveguide 14 has an intensity which is a function of the area of the light spot which overlaps the end of second waveguide 14.

Conduit 11 is preferably a cylindrical tube inserted through bore 15D of housing 15 and preferably comprises first fiber optic waveguide 12 and second fiber optic waveguide 14 fixedly disposed therein and preferably aligned substantially parallel to and on either side of optical axis 26. First fiber optic waveguide 12 transmits light from a light source 40 (such as a light emitting diode) to and out of transmitter end 42 toward first end 22 of lens 20. A pair of solid lines 46, 48 indicate two outermost light rays of the transmitted light within lens 20. The light rays illustrated by lines 46, 48 are reflected by the reflective surface 30 at second end 24 of lens 20. The reflected light rays, as indicated by broken lines 52, 54 are refracted by lens 20 to produce a focused light spot adjacent end 58 of second fiber optic waveguide 14. Lines 46, 48, 52 and 54 are equivalent to one-quarter of a sine wave of refraction of light within lens 20. Because lens 20 is a one-quarter pitch lens, the reflected light exits first end 22 of lens 20 with substantially the same aperture as the light transmitted from end 42 of first waveguide 12 when it enters lens 20 through first end 22. At least a portion of the light spot impinges on end 58 of second waveguide 14 which is preferably diametrically and equidistantly located from end 42 of first waveguide 12 about axis 26 of lens 20 when the parameter being sensed has a predetermined value. The center of the focused light spot is located at a radial distance from optical axis 26 which is equal to the radial distance from the center of end 42 of first waveguide 12 to optical axis 26. A light detector 59 is coupled to second waveguide 14 to provide an electrical output signal representative of the intensity of the light received and transmitted by second waveguide 14.

Displacement of lens 20 as a function of the parameter to be sensed preferably occurs in a radial direction indicated by arrow 60, such radial direction being substantially parallel to a line drawn between the centers of waveguide ends 42 and 58. The displacement preferably results from a force such as a difference in pressure or acceleration occurring substantially transverse to axis 26 of lens 20 and substantially normal to diaphragms 16A and 16B. When such a radial displacement of lens 20 occurs, waveguide ends 42 and 58 are no longer equally spaced about optical axis 26, but the focused light spot of reflected light is at a position diametric and equidistant from optical axis 26 with respect to end 42 of first waveguide 12. Thus a smaller portion of the light spot falls on end 58 of second waveguide 14 which causes a reduction in the intensity of the output signal responsive to the displacement. It is noted that the light spot moves a distance relative to end 58 of second waveguide 14 which is equal to twice the radial displacement of lens 20 from the equidistant position, thus resulting in an amplification of the displacement by a factor of two.

It is also within the scope of the present invention for displacement of lens 20 in response to changes of the parameter to occur along the optical axis 26 to provide a variation in light intensity received by second waveguide 14 responsive to coupling losses. Still further modes of operation are within the scope of the present invention including movement of one or both of the waveguides 12 and 14 relative to lens 20 as a function of the parameter.

Figure 4:
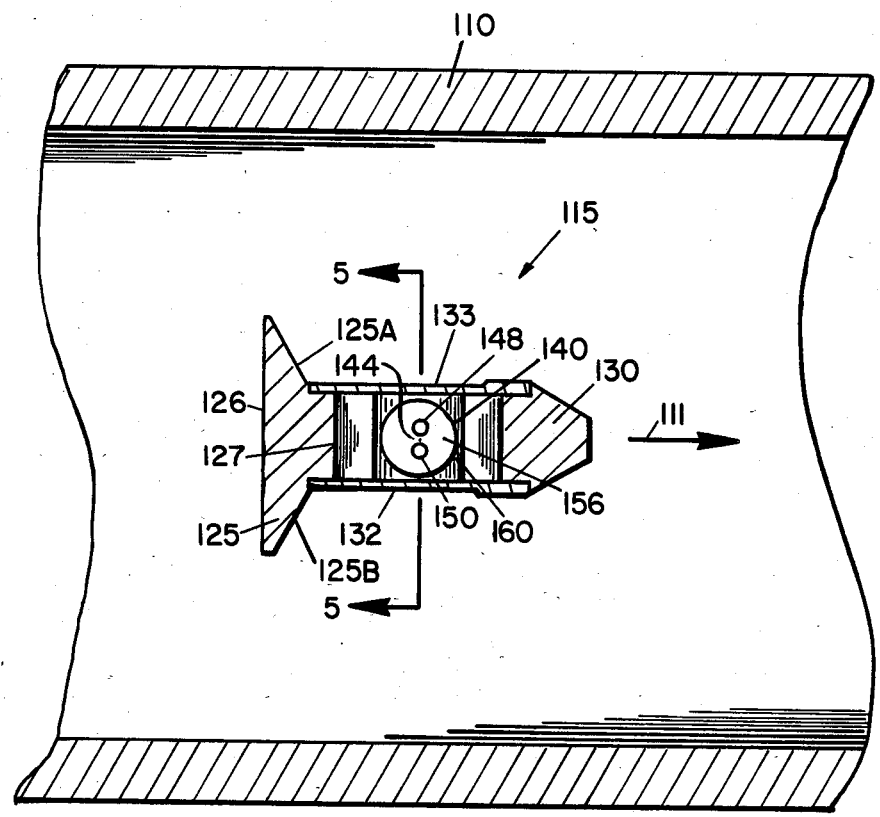
FIG. 4 is a top sectional view of a conduit carrying fluid having a vortex flowmeter using a light modulation sensor made according to the present invention.
Figure 5:
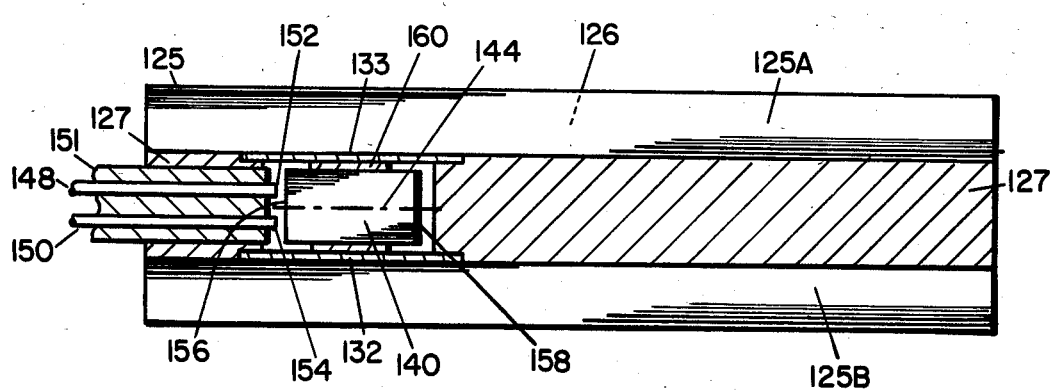
FIG. 5 is a sectional view of the vortex flowmeter taken along line 5—5 of FIG. 4.

A preferred application of the light modulation sensor is shown in FIGS. 4 and 5 wherein the light modulation sensor is used as a vortex sensor. A vortex shedding bar or housing means is indicated at 115 and is the subject of U.S. patent application Ser. No. 357,465 filed Mar. 12, 1982 now U.S Pat. No. 4,464,939 and assigned to the same Assignee as the present application. Shedding bar 115 is inserted in a flow pipe 110 which carries fluid in the direction of arrow 111. Shedding bar 115 comprises three distinct parts including a head section 125 having rear surfaces 125A and 125B and a flow face 126; an intermediate body section 127 that is integral with and immediately downstream from the head section 125; and a tail section 130 that is downstream of the intermediate body section 127 and integral to section 127. Bar 115 has a displacement means in the form of first and second diaphragms 132 and 133. First diaphragm 132 moves in response to pressure on one side of intermediate section 127 and second diaphragm 133 moves in response to pressure on the other side of intermediate section 127. As vortices are formed, they alternate from side to side on bar 115 and, hence, the pressure on each diaphragm changes. As the vortices switch, the pressure on one side of the intermediate section 127 will be higher than on the other until a vortex is formed on the opposite side, at which time the high pressure side becomes the low pressure side and vice versa. This causes the diaphragms 132 and 133 to deflect and move a graded index lens 140 which is coupled between the diaphragms 132, 133 as a function of the differential pressure. The lens 140 is displaced in a radial direction substantially normal to optical axis 144 responsive to the diaphragm 132, 133 deflection. A first fiber optic waveguide 148 and a second fiber optic waveguide 150 are fixedly supported within a cylindrical conduit 151 which is inserted through a bore in intermediate section 127 such that a first waveguide end 152 and a second waveguide end 154 are adjacent to a first lens end 156 as seen in FIG. 5. First waveguide end 152 and second waveguide end 154 are preferably diametrically located equidistant from optical axis 144 of lens 140 and equidistant from first lens end 156 when there is no displacement of lens 140. Light is transmitted from first waveguide end 152 into first lens end 156 and refracted and transmitted to a second end 158 of lens 140, where it is reflected back toward the first lens end 156. The reflected light is refracted to focus at least a portion thereof onto second waveguide end 154. The radial displacement of lens 140 caused by the vortices modulates the amount of light received by second waveguide end 154 such that the frequency and amplitude of light modulation are representative of the rate of flow.

In order to transmit the diaphragm deflection movement to the lens 140, a motion transmitting and diaphragm support assembly indicated at 160 is coupled to both first and second diaphragms 132, 133 and to lens 140 as by a suitable adhesive material. It should be noted that the motion of the diaphragms 132, 133 is a "unison" motion where both diaphragms 132, 133 move simultaneously in the same direction. The motion transmitting assembly 160 is thus attached to both diaphragms 132, 133 so that the motion transmitting assembly 160 moves precisely with the diaphragms 132, 133.

First fiber optic waveguide 148 and second fiber optic waveguide 150 extend from lens 140 in the intermediate section 127 to exit pipe 110. The intermediate section 127 is preferably rigidly supported such that transmissive vibrations or deflections which might affect light transmission are not transmitted to the first and second waveguides 148 and 150. As shown in FIG. 5, waveguides 148 and 150 preferably enter and exit intermediate section 127 along the same general path to simplify construction. The present invention is advantageous because the sensor is preferably single sided such that the transmitter and receiver means comprising the first and second waveguides 148 and 150 are on the same side of lens 140.

Figure 6:
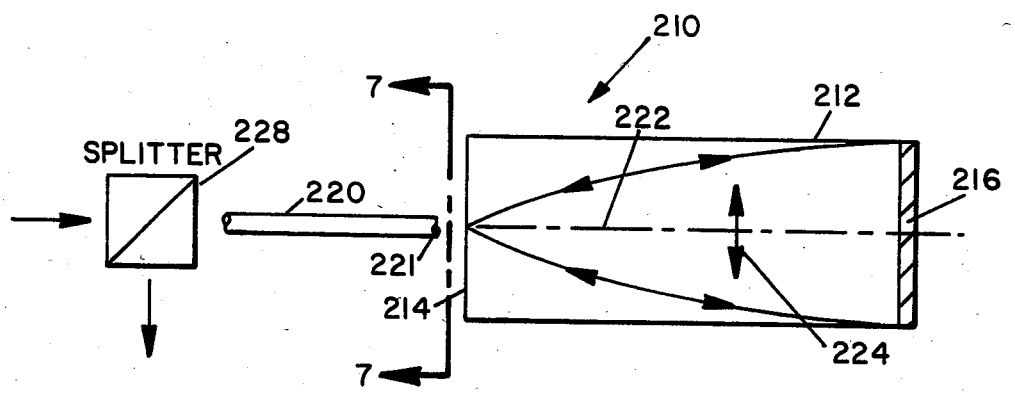
FIG. 6 is a transverse sectional representation of a further preferred embodiment of a light modulation sensor made according to the present invention having a single waveguide for transmitting and receiving light.

A further preferred embodiment in FIG. 6 comprises a light modulation sensor shown generally at 210. The sensor comprises a one-quarter pitch graded index lens 212 having a first end 214 and a second reflective end 216. Light is transmitted into first end 214 of lens 212 from a waveguide 220 such as an optical fiber. Waveguide 220 transmits light from an end 221 which is substantially along optical axis 222 of lens 212 when lens 212 is not displaced, (i.e. when the parameter has a predetermined value). The light enters first end 214 of lens 212 and is refracted toward second end 216. The light is reflected at second end 216 back and refracted to focus as a light spot which impinges on waveguide 220. When lens 212 is radially displaced from its rest position, waveguide 220 is no longer aligned with the axis 222 to receive substantially the entire light spot on end 221. In fact, the light spot has now moved a distance equal to twice the radial displacement of lens 212 relative to waveguide 220, thus reducing the intensity of the output signal responsive to the displacement. Waveguide 220 is coupled to a splitting means 228 which separates the input and output light from waveguide 220 and directs the output light to a detector or other processing means for control or display purposes. The intensity of the output light is representative of the force acting on lens 212.

Figure 7:
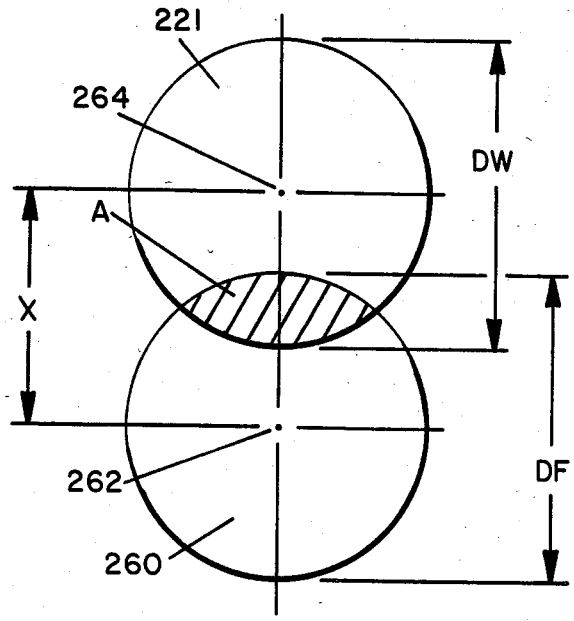
FIG. 7 is an end view of the waveguide and an output light spot taken along line 7—7 of FIG. 5.

In FIG. 7, wherein the numbering is consistent with FIG. 6, the interaction of a focused light spot 260 of reflected light and an end view representation of end 221 of waveguide 220 from FIG. 6 is shown. The light spot 260 is preferably of circular shape with a diameter DF having a light intensity distribution with greatest intensity in center 262 of the light spot. Waveguide end 221 is preferably of circular shape with a diameter DW. The centers 262 and 264 of light spot 260 and waveguide end 221 respectively are spaced apart a distance defined as x which is preferably equal to twice the radial displacement between optical axis 222 and center 262 of waveguide end 221. Distance x varies from zero to diameter DW of waveguide end 221 (which is preferably equal to diameter DF of light spot 260) but, x preferably is between 0.5 and 1.0 of diameter DW as an operating point, i.e. with no displacement caused by force between waveguide 220 and lens axis 222, thus allowing a total displacement of almost one waveguide diameter DW without harmonic generation.

The output signal on waveguide 220 is a function of the amount of the light spot 260 overlapping waveguide end 221 which is indicated by a shaded overlap area A. Overlap area A is given by the equation $$A = (d^2/2)(\cos^{-1}(x/d) - (x/d)\sqrt{1 - (x/d)^2})$$

Where
A = overlap area
x = distance between centers of light spot 260 and waveguide end 221
d = waveguide end 221 diameter (DW) and light spot 260 diameter (DF)

The output signal intensity on waveguide 220 is a function of the intensity of the portion of light spot 260 within the overlap area A. It is seen that the overlap area A can vary from zero to the area of waveguide end 221 depending upon the amount and direction of displacement. The output signal, is then preferably processed and displayed on a suitably calibrated output means to give an accurate indication of the parameter sensed.

Figure 8:
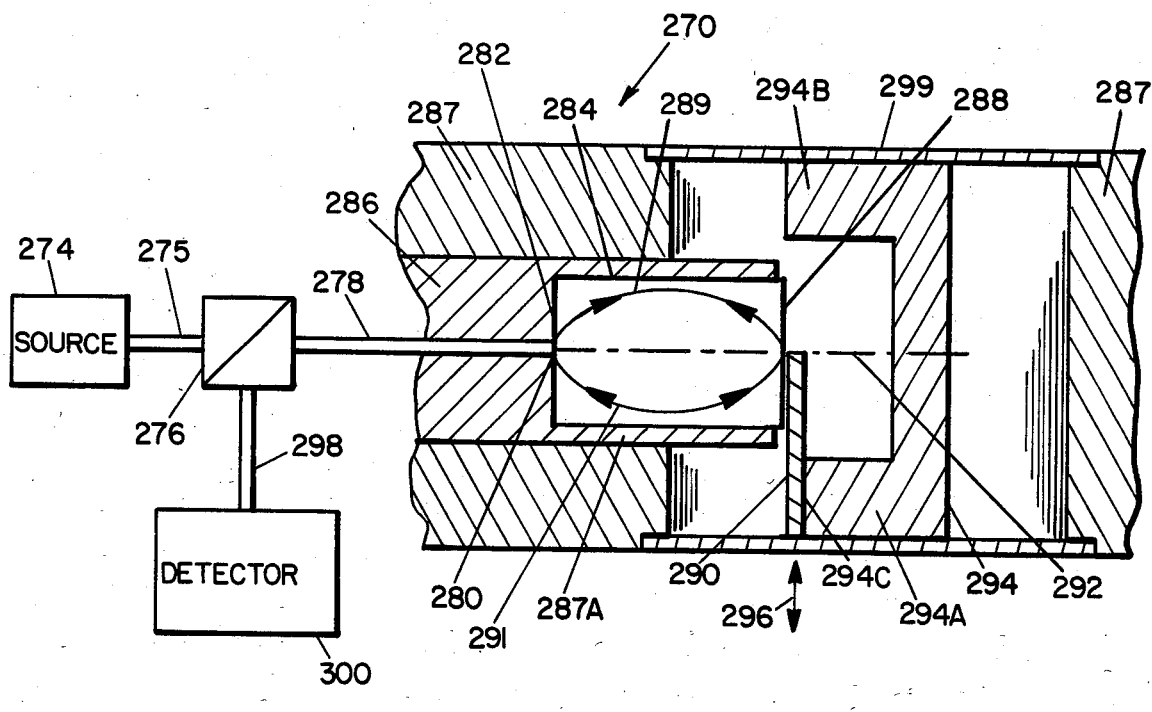
FIG. 8 is a sectional, partially schematic representation of still a further preferred embodiment of a light modulation sensor made according to the present invention.

A further preferred embodiment of the light modulation sensor is indicated at 270 in FIG. 8. A source 274 emits light which is transmitted through a waveguide 275 to a beam splitter 276. The light substantially passes through the beam splitter 276 and is transmitted by a waveguide 278 having an end 280 coupled to a first end 282 of a one-half pitch graded index lens 284. Lens 284 and waveguide 278 are disposed within a housing 286 such that lens 284 is preferably rigidly supported. Housing 286 is further fixedly supported within a sensor housing 287 through a bore 287A. Lens 284 receives the light from waveguide 278 and refracts and focuses the light toward a second end 288 of lens 284. The outermost light rays follow paths indicated by lines 289 and 291 which are in the form of a sine wave of one-half wavelength. A movable reflective surface 290 is positioned adjacent the second end 288 of lens 284 to reflect a substantial portion of the focused light emitted from the second end 288 of lens 284 back into lens 284. Reflective surface 290 preferably is positioned to reflect up to about one-half of the focused light when no forces are acting on reflective surface 290. Lens 284 has an axis 292 up to which reflective surface 290 extends at rest. Reflective surface 290 is coupled to a displacement means such as a U-shaped piston 294 for providing a movement of reflective surface 290 preferably substantially normal to axis 292 and responsive to a parameter such as pressure or acceleration as indicated by arrow 296. Piston 294 has a first leg 294A and a second leg 294B which are coupled between a pair of diaphragms 297 and 299 respectively. Diaphragms 297 and 299 are disposed on opposite sides of sensor housing 287 and displace responsive to forces applied thereto having components in the general directions of arrow 296. Reflective surface 290 is affixed to an end 294C of piston leg 294A such that reflective surface 290 is positioned closely adjacent to the second end 286 of lens 284 to minimize light losses, while remaining slightly separated therefrom such that no force is transmitted to lens 284 by movement of reflective surface 290. Light which is reflected by reflective surface 290 back into lens 284 is refracted and focused onto waveguide end 280. The light reflected is a function of the relative displacement of reflective surface 290 along second end 288 of lens 284 such that more or less than one-half of the light is reflected. Waveguide 278 transmits the reflected light to splitter 276 which directs the reflected light to a waveguide 298 which transmits the reflected light to a detector 300. Detector 300 detects the intensity of the reflected light and provides an output signal or visual representation representative of the parameter.

The preferred embodiment of FIG. 8 has an advantage in that calibration is accomplished by rotation of housing 286 substantially about its center axis. Because exact alignment of waveguide 278 and lens axis 292 within the center of housing 286 and alignment of reflective surface 290 with lens axis 292 is unlikely, rotation of housing 286 about its center during assembly, independent of reflective surface 290 results in a change of the alignment of the light focused at second lens end 288 on reflective surface 290 such that a desirable amount of light is reflected by reflective surface 290. A large tolerance in lining up waveguide 278 with lens axis 292 is also permitted and in some cases is desirable to enable changing the alignment of the light focused at second lens end 288 with reflective surface 290, thus reducing manufacturing costs while retaining accuracy.

What is claimed is:

1. A sensor for a vortex shedding flowmeter, the sensor comprising:

a light source;

a light detector;

a sensor housing which includes a vortex shedding body for inducing vortices in a fluid on first and second opposite sides of the body which are representative of flow of the fluid, the sensor housing having a cavity which extends therethrough from the first to the second side;

first and second diaphragms supported on the first and second sides of the sensor housing in generally parallel relationship, the diaphragms covering the cavity and being positioned with respect to the vortex shedding body to respond to pressure differentials caused by the vortices induced in the fluid by the vortex shedding body;

reflector means positioned within the cavity for reflecting light;

waveguide means extending through the sensor housing to the cavity for transmitting light from the light source toward the reflector means and for transmitting light received after reflection from the reflector means to the light detector;

lens means positioned between the waveguide means and the reflector means for directing light from the waveguide means to the reflector means and for focusing the light reflected by the reflector means to a position proximate the waveguide means, the light received by the waveguide means after reflection by the reflector means being a function of relative positions of the waveguide means, the reflector means, and the lens means; and coupling means connected between the first and second diaphragms for coupling movement of the diaphragms to at least one of the reflector means, the waveguide means, and the lens means so that light received by the waveguide means after reflection by the reflector means is a function of pressure differentials which cause deflection of the first and second diaphragms.

2. The sensor of claim 1 wherein the lens means comprises a graded index lens having an index of refraction which varies as a function of radial distance from an optical axis of the lens.

3. The sensor of claim 2 wherein the graded index lens has a first end positioned adjacent the waveguide means and a second end positioned adjacent the reflector means.

4. The sensor of claim 3 wherein the graded index lens has a pitch which is an integral number of quarter pitches.

5. The sensor of claim 1 wherein the waveguide means comprises first and second optical waveguides.

6. The sensor of claim 1 wherein the waveguide means comprises:

an optical waveguide having first and second ends, the first end being positioned adjacent the cavity; and a beam splitter located between the first end of the optical waveguide and the light source and light detector.

7. The sensor of claim 1 wherein the lens means has an optical axis and wherein the coupling means causes the relative movement to occur in a radial direction which is generally perpendicular to the optical axis.

8. The sensor of claim 1 wherein the waveguide means is fixedly connected to the sensor housing, and wherein motion of the first and second diaphrams causes motion of at least one of the lens means and the reflector means as a function of the pressure differentials.

9. The sensor of claim 8 wherein the lens means and the reflector means are connected together in a fixed relationship, and wherein the coupling means moves the lens means and the reflector means together in response to motion of the first and second diaphragms.

10. The sensor of claim 8 wherein the lens means is connected to the sensor housing in a fixed relationship to the waveguide means and wherein the coupling means causes movement of the reflector means in response to motion of the first and second diaphragms.

11. The sensor of claim 10 wherein the lens means is a one-half pitch graded index lens.

* * * * *